US007852776B2

(12) United States Patent
Hirano et al.

(10) Patent No.: US 7,852,776 B2
(45) Date of Patent: Dec. 14, 2010

(54) ROUTING LOOP DETECTION CONTROL APPARATUS

(75) Inventors: Jun Hirano, Kanagawa (JP); Chan Wah Ng, Singapore (SG); Pek Yew Tan, Singapore (SG); Tien-Ming Benjamin Koh, Singapore (SG); Mohana Dhamayanthi Jeyatharan, Singapore (SG)

(73) Assignee: Panasonic Corporation, Osaka (JP)

( * ) Notice: Subject to any disclaimer, the term of this patent is extended or adjusted under 35 U.S.C. 154(b) by 115 days.

(21) Appl. No.: 12/096,346

(22) PCT Filed: Dec. 7, 2006

(86) PCT No.: PCT/JP2006/324888

§ 371 (c)(1), (2), (4) Date: Jun. 5, 2008

(87) PCT Pub. No.: WO2007/066817

PCT Pub. Date: Jun. 14, 2007

(65) Prior Publication Data

US 2009/0161558 A1   Jun. 25, 2009

(30) Foreign Application Priority Data

Dec. 8, 2005   (JP) .............................. 2005-354972

(51) Int. Cl.
*H04L 12/26* (2006.01)
(52) U.S. Cl. ........................ 370/242; 370/249; 370/338; 370/401
(58) Field of Classification Search ................ 370/242, 370/241, 249, 254, 401, 349
See application file for complete search history.

(56) References Cited

U.S. PATENT DOCUMENTS 5,371,732 A * 12/1994 Brocken et al. ............. 370/217

(Continued)

FOREIGN PATENT DOCUMENTS

EP   1 553 734   7/2005

(Continued)

OTHER PUBLICATIONS

International Search Report dated Mar. 16, 2007.

(Continued)

*Primary Examiner*—Ricky Ngo
*Assistant Examiner*—Rasheed Gidado
(74) *Attorney, Agent, or Firm*—Dickinson Wright PLLC (57) ABSTRACT

There is disclosed a technique which can detect a packet routing loop (in particular, a nesting loop formed by MRs (mobile routers). According to this technique, an MR 114 connected as a subordinate to an MR 110 transmits a BU (Binding Update) message, to which added is an ARO (Access Router Option) including an address of a router (MR 110) connected at present, to an HA (Home Agent) 140 to which it pertains. Moreover, an MR 112 is connected as a subordinate to the MR 114 and, when connected to the MR 112, the MR 110 transmits a BU message, to which added is an ARO including an address of the MR 112, to the HA 140. At this time, the MR 112 also transmits a BU message, to which added is an ARO including an address of the MR 114, to the HA 140. Thus, the HA 140 can detect a routing loop formed by connections 120, 122 and 124.

2 Claims, 6 Drawing Sheets

U.S. PATENT DOCUMENTS

| | | | |
|---|---|---|---|
| 6,636,498 | B1 | 10/2003 | Leung |
| 6,765,881 | B1 | 7/2004 | Rajakarunanayake |
| 7,352,731 | B1* | 4/2008 | Leung ................ 370/338 |
| 2001/0046223 | A1* | 11/2001 | Malki et al. ............ 370/338 |
| 2003/0165117 | A1* | 9/2003 | Garcia-Luna-Aceves et al. ................ 370/238 |
| 2004/0032852 | A1 | 2/2004 | Thubert |
| 2004/0146007 | A1 | 7/2004 | Saadawi |
| 2005/0063311 | A1* | 3/2005 | Sekiguchi ............ 370/241 |
| 2006/0013143 | A1* | 1/2006 | Yasuie et al. ........... 370/249 |
| 2006/0062214 | A1* | 3/2006 | Ng et al. ............ 370/389 |
| 2006/0171370 | A1* | 8/2006 | Matsumoto et al. ....... 370/351 |
| 2008/0019330 | A1 | 1/2008 | Hirano |
| 2008/0107123 | A1* | 5/2008 | Rune et al. ............ 370/401 |

FOREIGN PATENT DOCUMENTS

| | | |
|---|---|---|
| WO | 2005/069559 | 7/2005 |

OTHER PUBLICATIONS

Ng, et al. "Taxonomy of Route Optimization models in the NEMO Context," IETF Standard-Working-Draft, Internet Engineering Task Force, IETF, CH, No. 4, Feb. 21, 2005, XP015039769 ISSN: 0000-0004 p. 33, paragraph A.3—p. 35.

V. Devarapalli, et al., "Network Mobility (NEMO) Basic Support Protocol," Network Working Group, RFC 3963, pp. 1-33, Jan. 2005, p. 6, line 1.

A Conta, et al., "Generic Packet Tunneling in IPv6 Specification," Network Working Group, RFC 2473, pp. 1-36, Dec. 1998, p. 6, line 3.

C. Ng, et al., "Securing Nested Tunnels Optimization with Access Router Option," NEMO Working Group, Internet Draft: draft-ng-nemo-access-router-option-0.1.txt, IETF Standard-Working-Draft, Internet Engineering Task Force,IETF, CH, No. 1, Jul. 12, 2004, XP015033183 ISSN: 0000-0004pp. 1-47, Jul. 2004, p. 6, line 5.

\* cited by examiner

| | 310 | 320 | 330 | 340 | |
|---|---|---|---|---|---|
| | HoA | CoA | ARO | Flag | |
| 481 | MR114.HoA | MR114.CoA124 | MR110.HoA | | |
| 482 | MR110.HoA | MR110.CoA126 | - - - | | ~240 |
| 483 | MR110.HoA | MR110.CoA120 | MR112.HoA | | |
| 484 | MR112.HoA | MR112.CoA122 | MR114.HoA | | |
| | ⋮ | ⋮ | ⋮ | ⋮ | |
| | | | | | |

ROUTING LOOP DETECTION CONTROL APPARATUS

TECHNICAL FIELD

The present invention relates to a routing loop detection control apparatus which detects a routing loop of packets (in particular, a nesting loop formed by mobile routers) in a packet-switched data communication network.

BACKGROUND ART

The number of radio devices has increased acceleratedly and it is expected that new technical fields (classes) will develop in a mobility technology. One of these fields is network mobility (NEMO) in which the entire network including nodes changes connection points as it stands. In a case in which the concept of host mobility supports is extended up to a network mobility support including nodes, a solution related to a moving network provides a mechanism which can reach a node in a mobile network with primary global address even when the mobile network makes a connection to the Internet through any connection point.

In IETF (Internet Engineering Task Force), a solution to network mobility disclosed in the following Non-Patent Document 1 is advancing at present. In the case of the network mobility (NEMO) support, each mobile network has a permanent home domain. In a case in which the mobile network is in connection to its own home network, a primary global address known as a home address (HoA) is allocated to a mobile router (MR) of the mobile network and a mobile network prefix is allocated to the mobile network. On the other hand, in a case in which the mobile network is remote from a home network, that is, when it is connected to a different foreign network, a temporary global address known as a care-of address (CoA) is commonly allocated to the mobile router. The idea of the mobile support is for, even in a case in which the mobile router is in connection with a different foreign network, enabling the delivery of packets at a node in that mobile network with an address composed of a mobile network prefix.

This idea is put into practice in a manner such that an entity known as a home agent (HA) is introduced into a home network. The mobile router registers a care-of address in the home agent through the use of a message known as binding update (BU). Thus, the home agent can generate a binding between a home address of the mobile router, a prefix of the mobile network and the care-of address. The home agent has a function to receive (intercept) a message addressed to the prefix of the mobile network and transfer a packet to the care-of address of the mobile router through the use of encapsulation of this packet (which signifies that one packet is put as a payload of a new packet and which is also known as packet tunneling).

IPv6 tunneling is the encapsulation of an inner IPv6 packet (inner packet) as the payload of an outer IPv6 packet (outer packet). This IPv6 tunneling is primarily defined in the following Non-Patent Document 2. The inner packet is sometimes referred to as a payload packet, and the outer packet is sometimes referred to as a tunnel packet. Moreover, the idea of using bi-directional tunnel between a mobile router and its home agent is also disclosed in, for example, the following Patent Document 1.

Figure 1:
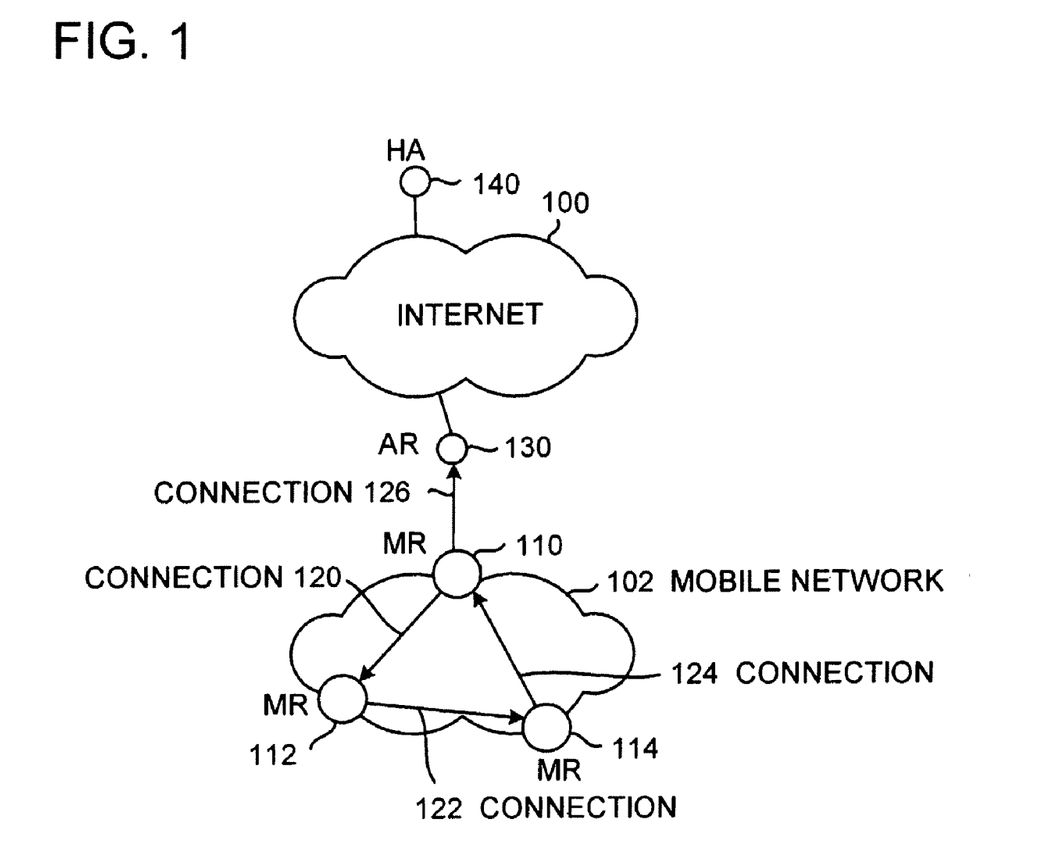
FIG. 1 is an illustration of an example of a configuration which is expected to generate a nesting loop in a conventional technique and in an embodiment of the present invention.

Although the employment of the bi-directional tunneling enables a network mobility support, there is a possibility of the occurrence of a routing loop. FIG. 1 is an illustration of a possible scenario of a routing loop (nesting loop). In FIG. 1, mobile routers (MR 110, MR 112, MR 114) are roaming in the Internet, and these mobile routers can form a tunneling loop.

In this case, the MR 110 is connected to the MR 112 as shown by a connection 120, the MR 112 is connected to the MR 114 as shown by a connection 122, and the MR 114 is connected to the MR 110 as shown by a connection 124. In a case in which one (for example, MR 110) of the mobile routers conducts the tunneling to the HA 140 to which it pertains, the MR 110 encapsulates a packet for the tunneling to the HA 140 and hands the packet over to the MR 112 which is an access router from the MR 110.

The MR 112 further encapsulates a packet for transferring to a home agent to which it pertains. Moreover, the packet is handed over to the MR 114 which also encapsulates the packet. Each of the mobile routers continuously adds a layer of the encapsulation one by one to the packet. This phenomenon is generally known as a routing loop. Still moreover, in the scenario related to the nesting (nesting state) of a plurality of mobile routers, it is also known as a nesting loop.

The routing loop is extremely undesirable because it consumes a network resource in a moment. Since a new hop limit filed is set in each of the packets encapsulated, the packet is forwarded infinitely in a routing loop of the mobile network. This will lose the effectiveness of the existing mechanism using a hop limit for the prevention of a routing loop.

Furthermore, an extra packet header is added to the packet by each encapsulation, which enlarges the size of the packet. The extreme enlargement of the packet size can cause the packet division (fragmentation). In consequence, a different packet (fragmented packet) will be introduced into a tunneling loop.

On the other hand, conventional techniques for solving the problems related to the routing loop have existed diversely. For example, the following Patent Document 2 discloses a general routing loop detecting method which tries to makes an estimation as to whether or not a routing loop has occurred, by employing a counter for counting the number of packets for a predetermined period of time for each hop number contained in an IP header.

In addition, there is a different conventional, technique for the prevention of a routing loop itself. For example, the following Patent Document 3 discloses a mobile ad-hoc routing method for the prevention of a routing loop. Still additionally, the following Patent Document 4 discloses a routing method using a spanning tree algorithm (universal tree algorithm) for the prevention of a routing loop with respect to layer 2 tunneling protocol (L2TP) or virtual private network (VPN). Yet additionally, the following Patent Document 5 discloses a technique of avoiding a loop, wherein a special option is embedded into a router advertisement message broadcasted by a mobile router for calculating a spanning tree topology of a mobile network in the mobile router.

Furthermore, with respect to a network mobility support, the following Non-Patent Document 3 discloses an extension technique in which each mobile router notifies an address of its own access router (there is a possibility that it is a mobile router) to the home agent, to which it pertains, through a binding update message. The address of this access router is inserted into the binding update message as a special option referred to as an access router option (ARO). Subsequently, a parent mobile router to which it pertains also transmits a binding update to the same home agent. This is based on the idea for optimizing a route. This route optimization enables the home agent to construct a series of addresses which pass for reaching the nested mobile router.

[Non-Patent Document 1] "NEMO Basic Support Protocol", RFC 3963, January, 2005

[Non-Patent Document 2] "Generic Packet Tunneling in IPv6 Specification", RFC 2473, December, 1998

[Non-Patent Document 3] "Securing Nested Tunnels, Optimization with Access Router Option", Internet Draft: draft-ng-nemo-access-router-option-0.1. txt, July, 2004

[Patent Document 1] U.S. Pat. No. 6,636,498

[Patent Document 2] US patent application Ser. No. 2005/0063311

[Patent Document 3] US patent application Ser. No. 2004/0146007

[Patent Document 4] U.S. Pat. No. 6,765,881

[Patent Document 5] US patent application Ser. No. 2004/0032852

However, the method disclosed in Patent Document 1 is not suitable for a router which is made to conduct the processing on thousands of packets per second. Moreover, this method is not an actual loop detection algorithm but it is a finding method of estimating an indication of a routing loop.

Moreover, there is a problem which arises with the methods disclosed in Patent Documents 2 and 3 in that, particularly when the probability of the occurrence of a loop is quite low, the computational cost of deliberately preventing a loop is not justifiable. Therefore, a complete and complicated loop avoidance mechanism is not suitable for the tunneling protocol.

Still moreover, according to all the loop detecting methods disclosed as conventional techniques, a detection or avoidance of a loop is made by a node in the loop. Although such nodes correspond to mobile routers in a mobile network, the mobile routers usually have restrictions on computational capacity, power, memory resource and others. In a case in which a loop detection algorithm or loop avoidance algorithm is packaged in these nodes, there occurs an increase in load of the mobile router and a reduction in operating time of the mobile router.

DISCLOSURE OF THE INVENTION

In consideration of the above-mentioned problems, it is an object of the present invention to provide a routing loop detection control apparatus which enables the detection of a packet routing loop (in particular, a nesting loop formed by mobile routers).

For achieving the foregoing purpose, a routing loop detection control apparatus according to the present invention comprises address information acquiring means for acquiring an address of each of a plurality of mobile routers and an address of a host mobile router connected to each of the plurality of mobile routers, and loop detecting means for detecting a routing loop among the plurality of mobile routers on the basis of the information acquired by the address information acquiring means.

The foregoing configuration enables the detection of a packet routing loop (in particular, a nesting loop formed by mobile routers).

Combined with the foregoing configuration, in the routing loop detection control apparatus according to the present invention, the loop detecting means includes parameter setting means for setting, as a parameter, the address of the host mobile router connected to a predetermined mobile router, address comparing means for making a verification as to whether the value of the parameter set by the parameter setting means agrees with an address of the predetermined mobile router, and routing loop detection control means for, when the verification by the address comparing means shows that the value of the parameter does not agree with the address of the predetermined mobile router, re-setting, as the parameter, an address of a host mobile router connected to the host mobile router set in the parameter and giving an indication for re-implementation of the processing in the address comparing means and further for, when the verification by the address comparing means shows that the value of the parameter agrees with the address of the predetermined mobile router, judging a detection of the routing loop.

The foregoing configuration enables tracing the host mobile routers having a function as an access router from the predetermined mobile router and, if the predetermined mobile router again appears as a host mobile router, a judgment can be made that a routing loop has occurred.

In addition, combined with the foregoing configuration, in the routing loop detection control apparatus according to the present invention, the routing loop detection control apparatus is provided in an home agent of at least one of the plurality of mobile routers, and comprises binding update message receiving means for receiving a binding update message, to which an access router option including an address of the host mobile router is added, from each of the plurality of mobile routers, and binding cache storing means for storing the address of each of the plurality of mobile routers received by the binding update message receiving means and binding information including the address of the host mobile router connected to each of the plurality of mobile routers.

With this configuration, the home agent can detect a packet routing loop.

Still additionally, combined with the above-mentioned configuration, the routing loop detection control apparatus according to the present invention further comprises binding information deleting means for deleting the binding information on a portion of or all of the mobile routers forming the routing loop detected by the loop detecting means for eliminating the routing loop detected by the loop detecting means.

With the aforesaid configuration, the home agent can cut off the routing loop by deleting the binding information.

Yet additionally, combined with the above-mentioned configuration, the routing loop detection control apparatus according to the present invention further comprises binding information notifying means for notifying a list of the binding information on all the mobile routers forming the routing loop to the mobile routers forming the routing loop detected by the loop detecting means.

With the aforesaid configuration, the home agent can notify the occurrence of the routing loop and the binding information causing the occurrence of the routing loop to the mobile routers, thereby enabling the mobile routers to eliminate the routing loop.

Moreover, combined with the above-mentioned configuration, the routing loop detection control apparatus according to the present invention further comprises loop detection control means for, at addition or update of the binding information, accepting the binding information in a state where a lifetime shorter than a normal time is set with respect to the binding information and for, after a reply of a binding acknowledge message, controlling the loop detecting means to make a verification as to whether or not the routing loop has occurred with respect to the accepted binding information, and loop elimination control means for, when the loop detecting means has detected the routing loop, rejecting the binding information upon receipt of next binding update message relative to the binding information subjected to the setting of the shorter lifetime and further for, when the routing loop has not been detected by the loop detecting means, upon receipt of a next binding update message relative to the binding information subjected to the setting of the shorter lifetime, setting the normal lifetime with respect to the binding information and accepting the binding information.

With the aforesaid configuration, it is possible to suppress a possible delay stemming from the detection processing on the routing loop.

The present invention has the above-mentioned configurations and provides the effect that the home agent can detect a packet routing loop (in particular, a nesting loop formed by mobile routers).

BEST MODE FOR CARRYING OUT THE INVENTION

Referring to the drawings, a description will be given hereinbelow of an embodiment of the present invention. The following description relates to method whereby a home agent detects that a nesting loop exists in mobile routers.

Figure 2:
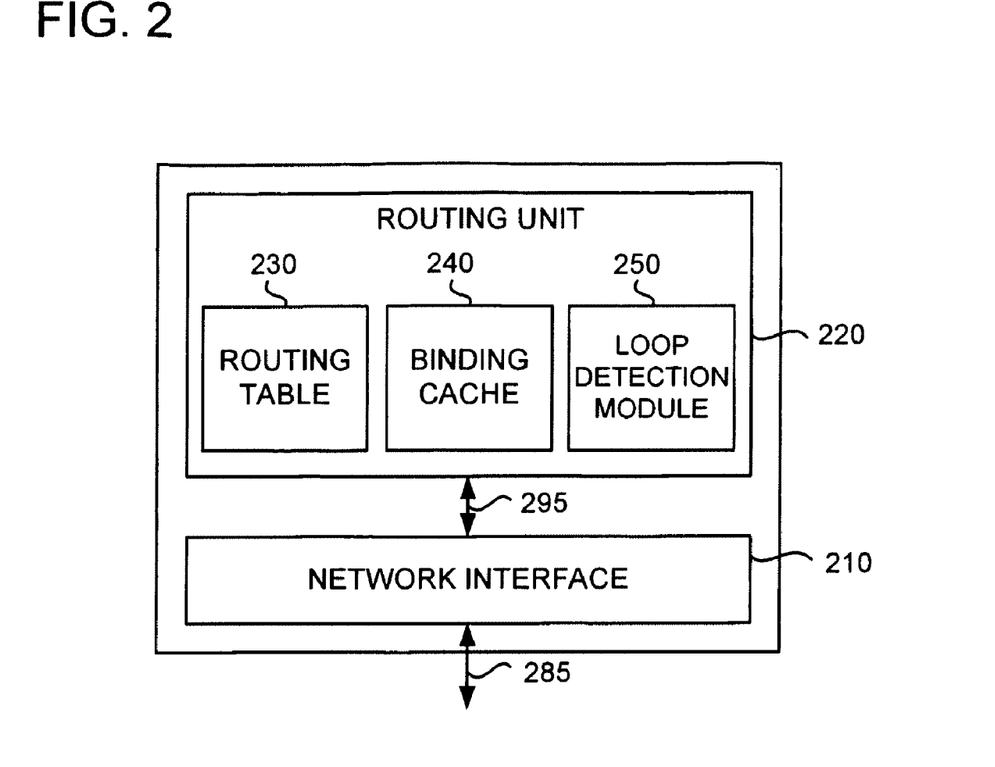
FIG. 2 is an illustration of an example of a configuration of a home agent according to an embodiment of the present invention.

FIG. 2 is an illustration of one example of a suitable functional architecture of a home agent according to an embodiment of the present invention. In FIG. 2, the home agent has one or a plurality of network interfaces 210 and a routing unit 220. In FIG. 2, the network interface 210 is shown as being only one in number.

Each network interface 210 is a functional block which represents all network hardware, software and protocols needed when the home agent makes communications through a path 285 with other nodes by use of a link access technology. For example, in a 7-layers model of OSI (Open System Interconnect) under ISO (International Standards Organization), the network interface 210 contains a physical layer and a data link layer.

Upon receipt of a packet, for further processing, the network interface 210 delivers the packet through a data path 295 to the routing unit 220. Likewise, at the transmission of the packet, the routing unit 220 hands the packet over to the corresponding network interface 210 for the transmission through the data path 295.

Moreover, the routing unit 220 carries out all processing related to the routing in the Internet working layer. Under the OSI model, the routing unit 220 contains all the functions of the network layer. The routing unit 220 basically implements the IPv6 and mobile IPv6/NEMO home agent function.

The routing unit 220 includes a routing table 230, a binding cache 240 and a loop detection module 250.

The routing table 230 contains information for the routing unit 220 to determine a path. Preferably, the routing table 230 is organized as a list of entries and each entry contains a destination flied and a next hop field. The destination field stores a full destination address or a destination address prefix, and the next hop field specifies a transferred place of a packet having a destination address agreeing with a value stored in the destination field.

Still moreover, the routing unit 220 additionally has a function to establish, maintain and discard bi-directional tunnels. For example, under the NEMO basic support, a mobile router establishes a bi-directional tunnel with respect to the home agent to which it pertains.

A person skilled in the art would recognize that it is preferable that the routing unit 220 creates a virtual network interface known as a tunnel interface. This tunnel interface would be seen to the routing unit 220 as being equivalent to a different network interface 210. Moreover, in the routing table 230, it is also appropriate that this tunnel interface can be referred to as a next hop interface which can be selected.

In addition, the binding cache 240 is used for storing the binding between a home address and a care-of address with respect to a mobile node (i.e., MIPv6 mobile host or NEMO mobile router).

Figure 3:
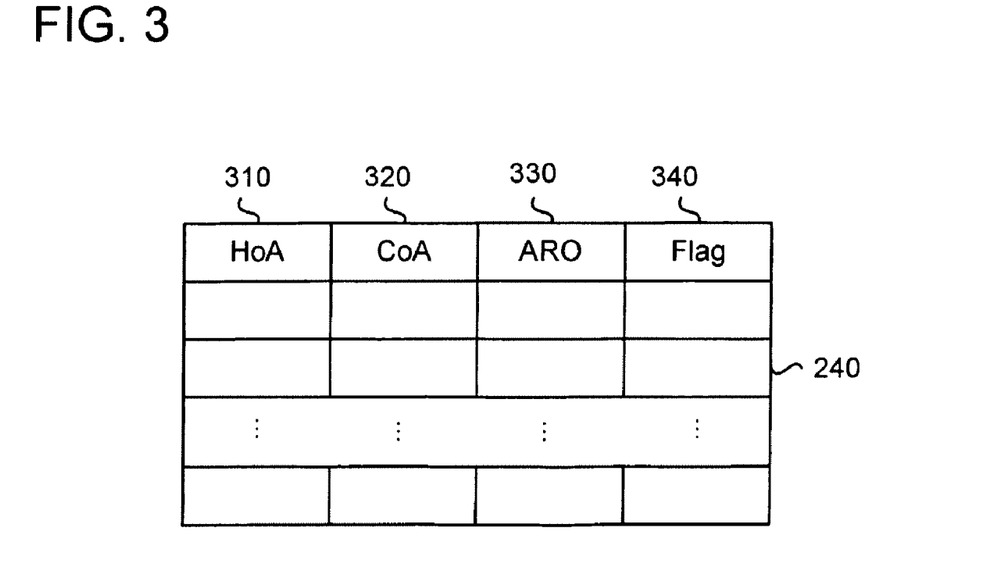
FIG. 3 is an illustration of an example of a configuration of a binding cache of a home agent according to an embodiment of the present invention.

FIG. 3 is an illustration of one example of a conceptual data structure in the binding cache. The binding cache 240 is basically a list of entries, and each binding cache entry contains information on specified binding. For example, each binding cache entry contains a home address (HoA) field 310, a care-of address (CoA) field 320, an access router option (ARO) field 330 and a flag field 340.

The HoA field 310 is used to store a home address of a mobile node. The CoA field 320 is used to store a care-of address of a mobile node. The ARO field 330 is used to store an address of an access router of a mobile node. The flag field 340 is used to store related information on binding.

For example, by using a portion of the flag field 340, it is possible to store flag information received through the use of a binding update message. In the prevent invention, it is preferable to store, in a portion of the flag field 340, the information as to whether or not a loop has been detected with respect to a specified binding cache-entry.

Incidentally, to a person skilled in the art, it is obvious that other fields of the binding cache entry are omitted in FIG. 3. For example, each binding cache entry can store a lifetime of an entry which can accomplish valid binding. Moreover, with respect to the binding of a mobile router, it is also appropriate that a mobile network prefix, a mobile router possesses, is contained in a binding cache entry. Still moreover, it is also appropriate that, for supporting the registration of a plurality of care-of addresses relative to a single home address, an identifier field is contained in the binding cache entry for specifying a plurality of different bindings associated with the same home address.

Furthermore, the loop detection module 250 illustrated in FIG. 2 has a function to detect the presence of a nesting loop. As will be mentioned later, the loop detection module 250 detects a routing loop (nesting loop related to mobile routers which are in a nesting state) between the mobile routers registered in the home agent, by use of the information stored in the binding cache 240. The above-mentioned registration in the home agent signifies making the home agent have the valid binding between a home address and one or more care-of addresses.

A person skilled in the art would recognize that, although some other functions may actually be necessary, it is obvious that the functional architecture of the home agent shown in FIG. 2 contains only a minimum of functional blocks required for realizing the home agent. For example, the home agent can require a security module whereby only the reliable mobile routers can establish the basic (primary) binding in the home agent.

Secondly, referring to FIGS. 4A and 4B, a description will be given of an operation according to a preferred embodiment of the present invention.

Figure 4A:
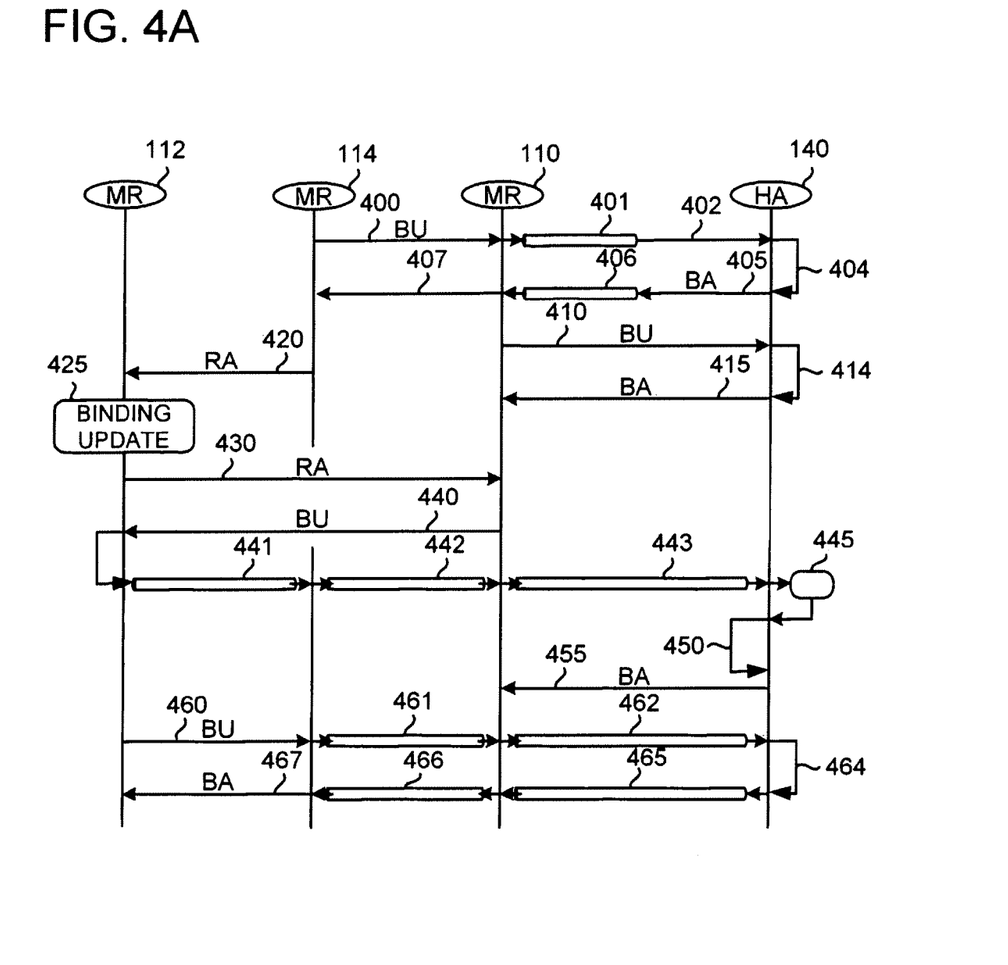
FIG. 4A is a sequence chart showing one example of an operation according to an embodiment of the present invention.

FIG. 4A shows a message sequence for binding update processing between the mobile routers (MR 110, MR 112, MR 114) and the home agent (HA 140). FIG. 4B shows one example of the contents of the binding cache 240 of the home agent (HA 140) illustrated in FIG. 1 at this time.

In the network configuration shown in FIG. 1, let it be assumed that the home agent (HA 140) is a home agent of a mobile router (MR 114). Moreover, let it be assumed that the MR 110 is connected to the MR 112 as shown by the connection 120, the MR 112 is connected to the MR 114 as shown by the connection 122 and the MR 114 is connected to the MR 110 as shown by the connection 124, thereby forming a nesting loop. The MR 110 has a plurality of network interfaces and, as shown by the connection 120, other than the interface connected to the MR 112, another interface is connected to a fixed access router 130 as shown by a connection 126.

In addition, let it be assumed that, as disclosed in Non-Patent Document 3, in the respective MRs 110, 112 and 114, there is packaged a function which makes a transmission of a BU message additionally having an access router option including an address of a host router.

In the message sequence shown in FIG. 4A, first, the MR 114 transmits a BU message 400 to the home agent (HA 140) to which it pertains.

A person skilled in the art would recognize that the MR 114 does not reach the completion of a binding update with respect to the home agent (HA 140), to which it pertains, at this time and, since the MR 114 does not accept a connection from a different mobile network node, it is clear that the connection 122 is not established yet. Likewise, the MR 112 does not reach the completion of a binding update with respect to the home agent, to which it pertains, at this time and, since the MR 112 does not accept a connection from a different mobile network node, the connection 120 does not reach the establishment yet. Accordingly, the connections already established at this time are only the connections 124 and 126.

When the MR 114 transmits a BU message 400 to the HA 140, the BU message 400 first arrives at the MR 110. In this case, let it be assumed that the MR 110 does not register the binding in the HA 140. The MR 110 encapsulates the BU message 400 into a tunnel 401 to the home agent (not shown) to which it pertains. This BU message 400 is transferred after decapsulated into a message 402 in the home agent to which the MR 110 pertains.

Upon receipt of the message 402, the HA 140 updates its own binding cache as shown as processing 404.

According to Non-Patent Document 3, in the BU message, there are written a binding between a home address of the MR 114 (i.e., MR 114. HoA), a care-of address of the MR 114 (i.e., MR 114. CoA 124) and an ARO value equal to a home address of the MR 110 (i.e., MR 110. HoA). Therefore, at this time, an entry 481 shown in FIG. 4B is created in the binding cache 240 of the HA 140.

A binding acknowledgment (BA) message 405 transmitted from the HA 140 to the MR 114 is first received (intercepted) by the home agent of the MR 110 through the reverse path. Then, it is tunneled through a tunnel 406 to the MR 110 and finally transferred as a message 407 to the MR 114.

In addition, at the transmission of the BU message 400, the MR 114 can also put, therein, a special router alert option (RAO) for making a request for the direct transfer to a destination of a packet from the MR 110. Thus, the MR 110 checks whether or not it is registered in the HA 140.

In this case, the MR 110 is not registered in the HA 140 and the MR 110 tries to conduct the processing for the transmission of a BU message 410 to the HA 140. Since the connection 120 is not established yet at the transmission of this BU message 410, the MR 110 registers only the current connection 126 to the AR 130. Therefore, in the BU message 410, there are contained only its own home address (MR 110. HoA) and its own care-of address (i.e., MR 110. CoA 126) made from the connection 126.

Upon receipt of the BU message 410, as shown as processing 414, the HA 140 updates its own binding cache and returns a. BA message 415. At this time, an entry 482 shown in FIG. 4B is created in the binding cache 240 of the HA 140.

Through the processing up to the present, its own binding reaches completion and, hence, the MR 114 starts to accept the connection in the mobile network link to which it pertains. At this time, preferably, the MR 114 broadcasts, for example, an RA (Router Advertisement) message 420. Upon receipt of this RA message 420, the MR 112 makes a connection with the MR 114 for the establishment processing on the connection 122 shown in FIG. 1.

As shown as processing 425, the MR 112 starts the registration processing (binding update processing) in a home agent (not shown) to which it pertains. After the completion of this binding, the MR 112 can start to accept the connection in the mobile network link to which it pertains. At this time, preferably, the MR 112 broadcasts, for example, an RA message 430. Upon receipt of this RA message 430, the MR 110 makes a connection with the MR 112 for the establishment processing on the connection 120 shown in FIG. 1.

Furthermore, the MR 110 transmits a binding up date message to nodes (including the home agent, to which it pertains, and the HA 140) which received the BU message in the past. By a new binding update, a new care-of address (i.e., MR 110. CoA 120) of the MR 110 made from the connection 120 is notified to these nodes.

The BU message transmitted from the MR 110 to the HA 140 is shown as a message 440 in FIG. 4A. This message 440 is transmitted through the connection 120 and reaches the MR 112. Since the MR 112 does not transmit a BU message to the HA 140 yet, it encapsulates the BU message 440 into a tunnel to a home agent (not shown) to which the MR 112 pertains. This tunnel packet 441 passes through the MR 114 and, in the MR 114, it is further encapsulated into a tunnel packet 442 to the HA 149. Since the MR 110 which has received this tunnel packet 442 has been binding-registered with respect to the HA 140 and, hence, this packet is simply transferred as a packet 443 to the HA 140. Because of the double encapsulation, the MR 110 cannot grasp that this packet has been transmitted from itself.

The HA 140 decapsulates the packet 443 and transmits an inner packet of that tunnel packet to the home agent to which the MR 112 pertains. At this time, the home agent of the MR 112 decapsulates the packet and transfers the actual BU message 440 to the HA 140. The processing in which the HA 140 again receives the BU message after the transmission has once been made to the home agent of the MR 112 is shown simply as the processing 445 in FIG. 4A.

Moreover, as shown as processing 450, the HA 140 adds an entry containing a binding written in the BU message, 440 to its own binding cache. As shown in the binding cache 240 in FIG. 4B, this binding cache entry 483 contains an HoA field of the MR 110. HoA, a CoA field of the MR 110. CoA 120 and an ARO field of the MR 112. HoA.

Although a BA message 455 transmitted from the HA 140 to the MR 110 traces the reverse path, the detailed processing related to the double encapsulation is omitted in FIG. 4A and, instead, only one arrow indicating the BA message is shown so as to simplify the illustration.

At the transmission of the BU message 440, the MR 110 can also put, therein, a special router alert option for making a request for the direct transfer to a destination of a packet from the MR 112. Thus, the MR 112 checks whether or not it is registered in the HA 140.

In this case, the MR 112 is not registered in the HA 140, and the MR 110 tries to conduct the processing for the transmission of a BU message 460 to the HA 140. In the BU message 460, there are contained a binding between its own home address (MR 112, HoA) and its own care-of address (i.e., MR 112. CoA 122), and an access router option value (MR 114, HoA).

The BU message 460 arrives at the MR 114 where it is encapsulated into a tunnel packet 461. Moreover, the packet 461 is directly transferred as a packet 462 from the MR 110 to the HA 140.

Incidentally, a nesting loop (loop formed by the connection 120, the connection 122 and the connection 124) has already been established at this time. Accordingly, at the transfer of the packet 462, there is a possibility that the MR 110 selects the connection 120 instead of the connection. In this case, the packet again passes through the MR 112 and the MR 114 and returns to the MR 110. Moreover, the MR 110 has carried out load balancing between its own interfaces, and it is also possible to assume that there is a probability that the packet is sent through the connection 126 in place of the connection 120. FIG. 4A is a simplified view showing a case in which the packet 462 is forwarded through the connection 126 to arrive at the HA 140.

A person skilled in the art would recognize that, even if the packet 461 repeatedly passes through the nesting loop, the MR 110 finally selects the connection 126 instead of the connection 120 and the BU message finally arrives at the HA 140.

Upon receipt of the BU message 462, the HA 140 adds an entry to its own binding cache as shown as the processing 464. As illustrated in FIG. 4B, this binding cache entry 484 contains an HoA field of the MR 112. HoA, a CoA field of the MR 112. CoA 122 and an ARO field of the MR 114. HoA.

In a case in which there exists no loop detection algorithm, the HA 140 transmits a BA message 465 for carrying out the confirmation processing. This BA message passes through the MR 110 and the MR 114 and arrives at the NR 112. In FIG. 4A, this is illustrated as packets 465, 466 and 467.

On the other hand, in a case in which a loop detection algorithm is executed in the HA 140, the formation of a loop is detected by this algorithm at the time of the creation of a binding cache entry 484. In the case of the detection of a loop, it is also appropriate to use a BA message 465 as a message for rejecting the binding.

In this connection, other than the detection of a nesting loop at the time of the reception of a new BU message and the creation of a binding cache entry, it is also appropriate that, for example, as disclosed in Non-Patent Document 3, a loop detection algorithm is operated to carry out the nesting loop detection processing in a case in which a routing header is made from an entry specifying an ARO or when an entry is re-referred to for the path optimization.

Figure 5:
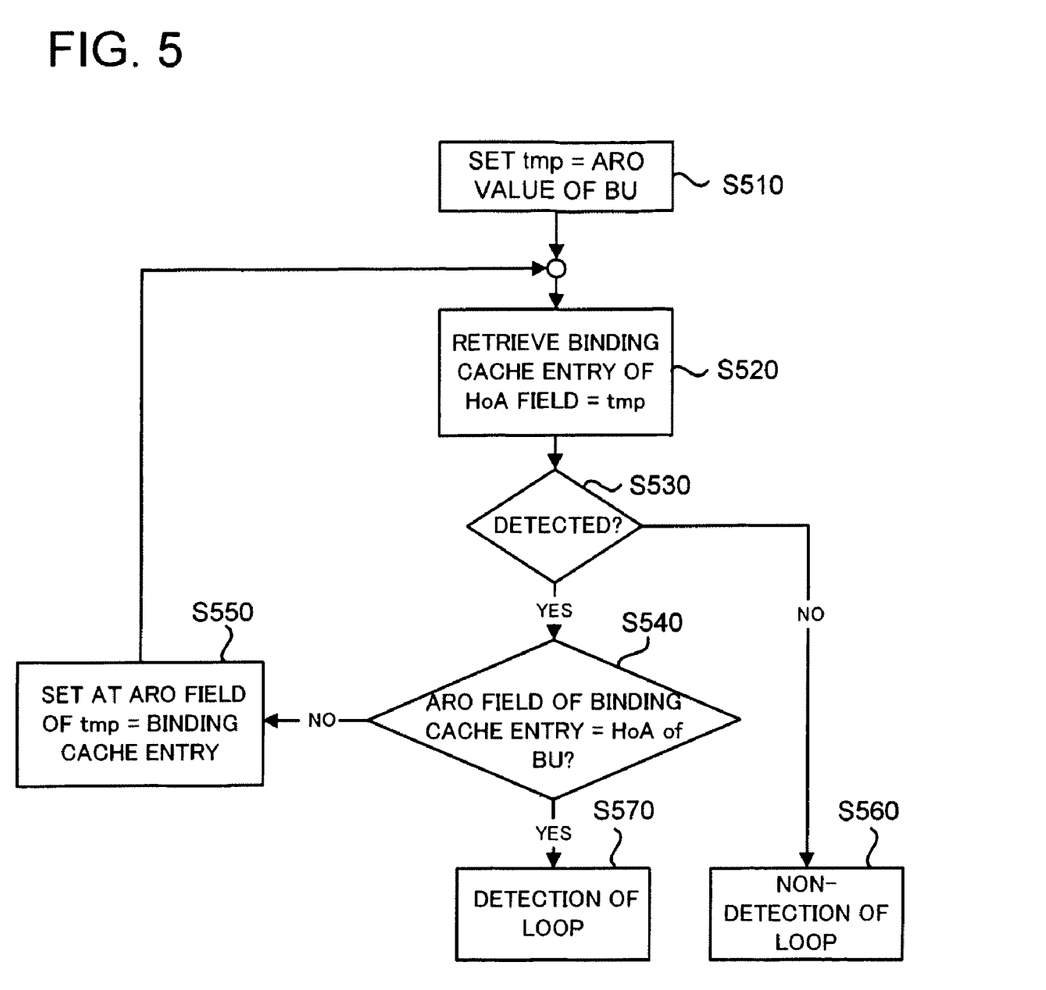
FIG. 5 is a flow chart showing one example of a nesting loop detection algorithm to be executed by a home agent according to an embodiment of the present invention.

FIG. 5 is an illustration of an algorithm for the detection of a nesting loop. It is preferable that this algorithm is executed by the loop detection module 250. Moreover, it is also appropriate that this algorithm is executed at the reception of a new BU message, or that the algorithm is implemented as a daemon process for monitoring the binding cache periodically to detect a nesting loop. In the example illustrated here, let it be assumed that an algorithm is run each time a new BU message is received. Incidentally, a person skilled in the art would recognize that, when the algorithm shown in FIG. 5 is run as a monitoring daemon, there is no need to make a special change, or there is a need to make only a minimum of change.

In FIG. 5, in the case of the reception of a new BU message, first, the initialization on a temporary variable (indicated as tmp in FIG. 5) is made at a step S510, and an ARO value written in the BU message is stored as a temporary variable. If there is no ARO in the BU message, the algorithm comes to an end without making the loop detection.

Following this, a retrieval on the binding cache 240 is made at a step S520. This retrieval seeks an entry having a HoA field 310 equal to a value stored as the temporary variable at this time.

If a judgment at a step S530 shows no detection of the aforesaid entry, the algorithm comes to an end without the detection of a loop as shown at a step S560. On the other hand, if one or more entries mentioned above are found the step S530, a check is made on each of the found entries at a step S540 so as to confirm whether or not a value equal to the home address in the new BU message is contained in the ARO field 330.

If the ARO field 330 contains the value equal to the home address in the new BU message, a nesting loop is detected as indicated at a step S570, and the algorithm comes to an end. On the other hand, if the ARO field 330 contains no value equal to the home address in the new BU message, the operation advances to a step S550 for carrying out the duplication processing on each of the found entries.

At the step S550, the temporary variable is updated and the value of the ARO field 330 of the binding cache entry is stored as a temporary variable. Moreover, the algorithm returns to the step S520 to repeatedly conduct the processing using this new temporary variable value.

The algorithm shown in FIG. 5 is applied to the scenario shown in FIG. 4A for exemplifying a method in which this algorithm detects a nesting loop. In this case, the processing 464 at the time that the HA 140 receives the BU message 462 is conducted, and the binding cache 240 has the contents shown in FIG. 4B.

At the step S510, the temporary variable is initialized with the ARO value (i.e., MR 114. HoA) of the BU message 460. Moreover, at the step S520, a retrieval on the binding cache 240 is made, and the retrieval is made on an entry having the HoA field 310 equal to the value (MR 114. HoA) stored in the temporary variable at this time. The entry 481 is detected in this way.

Then, at the step S540, a check is made on the ARO field 330 of the entry 481 so as to confirm whether or not the value equal to the home address in the new BU message is included in the ARO field 330. Since the ARO field 330 includes the MR 110. HoA and it differs from the value of the home address in the new BU message, at the step S550, the temporary variable is replaced with the MR 110. HoA.

Subsequently, the algorithm returns to the step S520 for again making the retrieval on the binding cache 240. The retrieval is made on an entry having the HoA field 310 equal to the value (MR 110. HoA) stored in the temporary variable at this time. The entry 482 and the entry 483 are detected in this way.

At the step S540, an evaluation is not made with respect to the entry 482 having the valid ARO field 330. However, with respect to the entry 483, it is found that the ARO field 330 includes the same value as the home address (i.e., MR 112. HoA) of the received BU message. This allows the detection of a loop reliably.

In response to the detection of the presence of a nesting loop, the home agent can rectify this problem by use of various means. For example, as one method, by merely making a notification to a manager (person), the manager rectifies the problem. There may be a case in which a nesting loop is formed in a very complicated manner, which can make it difficult to rectify the problem even by using any software. Therefore, the above-mentioned notification to the manager provides advantages that the problem can be rectified by human intervention.

In addition, the home agent can transmit a message for informing of the presence of a nesting loop to the mobile router involved in the nesting loop. Preferably, this message contains a list of the mobile routers existing in the loop and is carried by a binding acknowledgment message or a binding error message. The mobile routers can specify the binding related to its own connection from this list to cut off the connection causing the loop.

Still additionally, preferably, the home agent removes the binding of the mobile router affected by the nesting loop and writes an appropriate state value in a binding acknowledgment message or a binding error message to indicate the fact that the binding error is due to the formation of the nesting loop. This enables the source of the problem to be notified to the mobile routers so that the mobile routers can rectify the problem by themselves.

Moreover, by removing the binding of the mobile routers affected, there is an advantage in that these mobile routers can avoid the transmission of a packet using this binding. In consequence, it is possible to limit the undesirable influence which can occur due to the packet transmission in the nesting loop consuming network resources.

There is a case in which a direct handling method involves merely removing the bindings of all the mobile routers affected. Therefore, it is also appropriate to specify the mobile routers causing the occurrence of a nesting loop for removing only the bindings of these mobile routers.

Other than the above-described loop avoiding methods, for example, it is also possible to employ a method of preventing the formation of a loop by conducting a negotiation for loop avoidance among the home agents respectively corresponding to a plurality of mobile routers. Moreover, it is also appropriate that a home agent specifies a path for avoiding the detected loop and sets this path specifically.

Although in the above description a mobile router existing at a higher-order position of a mobile router (for example, the MR 110 when viewed from the MR 114) transmits a BU message (BU message 410 in FIG. 4A) to a home agent (HA 140) of the lower-order mobile router (MR 114) so as to put the binding information together in the HA 140, it is also appropriate that each of the mobile routers transmits a BU message, to which an ARO is added, to only an HA, to which it pertains, so that the HAs corresponding to the respective mobile routers carry out the loop detection in cooperation with each other. In this case, information equivalent to the binding cache 240 illustrated in FIG. 4B is created in a manner such that the binding information are interchanged among the HAs.

In this status, the MR 110 does not carry out the registration in the HA 140 yet, and the processing is conducted which transmits the BU message to the HA 140.

Figure 6:
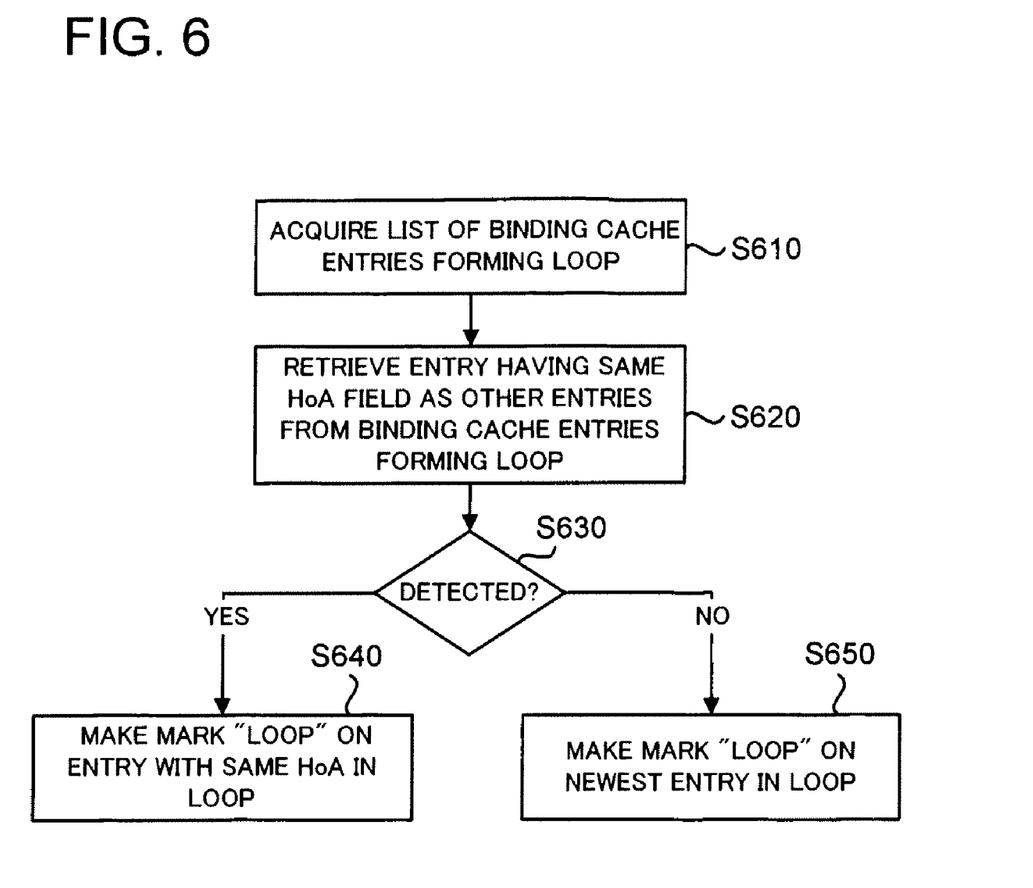
FIG. 6 is a flow chart showing one example of a nesting loop cutoff algorithm to be executed by a home agent according to an embodiment of the present invention.

FIG. 6 is an illustration of one example of an algorithm available in a case in which a home agent specifies a binding cache entry to be removed for cutting off a nesting loop (preventing the formation of a loop). A description will be given hereinbelow of a method in which a home agent removes only one or some bindings for cutting off a nesting loop.

A step S610 is first implemented to acquire a list of binding cache entries related to a nesting loop. This is realizable in various types of manners. For example, the extraction of the list is feasible through the use of the algorithm shown in FIG. 5. The algorithm shown in FIG. 5 is to be used for detecting the presence of a loop, and it is also acceptable that the entry list is stored while the loop detection is made by this algorithm.

After the acquisition of the list of the entries in the loop, at a step 620, the retrieval on the binding cache 240 is made, and the retrieval is for all the entries having the same HoA field 310 as other entries in the list. In the case of no detection of such an entry, the algorithm advances to a step S650 to make a mark "loop (in-loop)" on the binding cache entry inserted latest.

On the other hand, if there exists an entry having the same HoA entry as other entries in the list, the algorithm proceeds to a step S640. At this step S640, the mark "loop (in-loop)" is given to the relevant entry in the list.

In consequence, the binding cache entry having the mark referred to as "loop" is removed, thereby cutting off the loop. A person skilled in the art would clearly recognize that the mobile routers having a plurality of bindings and related to a nesting loop are to be specified by the algorithm shown in FIG. 6.

In the case of the detection of such mobile routers, a preferred loop cutoff method involves the removal of the bindings of the mobile routers related to the loop. Even if the loop is cut off in this manner, all the mobile routers can continuously use at least one of the connections among the mobile routers.

Figure 4B:
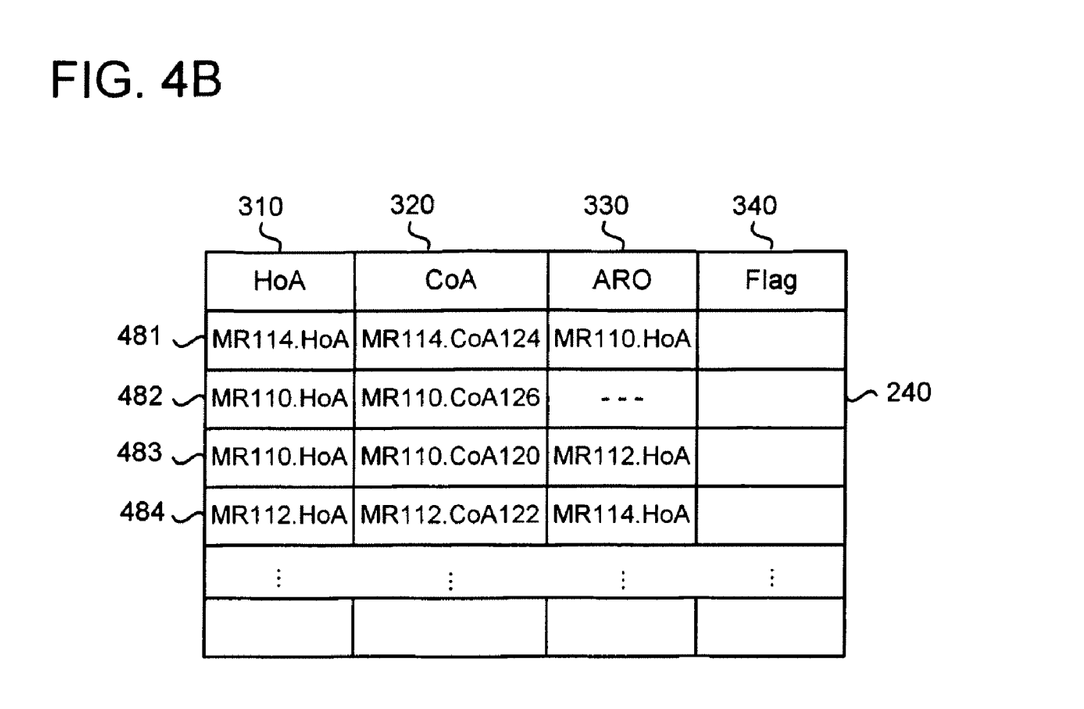
FIG. 4B is an illustration of one example of a binding cache of a home agent produced by the operation of the sequence chart shown in FIG. 4A.

Moreover, by referring to the example illustrated in FIG. 4B, a person skilled in the art would obviously recognize that the mark of "loop" is put on the binding cache entry 483 through the use of the algorithm exemplified in FIG. 6. This binding cache entry 483 corresponds to the connection 120 shown in FIG. 1. Still moreover, a person skilled in the art would obviously recognize that the nesting loop disappears when the connection 120 is removed while the MR 110, the MR 112 and the MR 114 maintain the paths to the Internet 100.

Furthermore, a principle similar to that used in the algorithm in FIG. 6 is also applicable to mobile routers. In this case, preferably, the home agents transmit a list of bindings related to the loop to the mobile routers.

Each of the mobile routers can check this list to specify, of its own connections at present, the connections related to the loop. In a case in which a plurality of connections are established and at least one of them is not involved in the loop, the mobile router can voluntarily remove the connections involved in the loop.

A person skilled in the art would fear that there may be a possibility that the loop detection algorithm or loop cutoff algorithm described in this specification requires a considerable computational load particularly when the home agent holds the binding cache 240 including a large number of (thousands of) entries.

Accordingly, in a case in which the home agent transmits a binding acknowledgment after the completion of the algorithm, there is a possibility that a serious delay occurs on the return of the binding acknowledgment. For this reason, it is preferable that the loop detection algorithm and the loop cutoff algorithm are implemented as a daemon process and monitor the binding cache in the background.

In a case in which, in response to a detection of a loop, the loop cutoff algorithm specifies binding cache entries to be removed for the loop disconnection, it is possible to give the mark "loop" to these entries. It is preferably that one bit in the flag field 340 of the binding cache entry is used as the mark "loop". Thus, when the mobile router tries to update the binding with a subsequent BU message, the home agent checks whether or not the "loop" bit is set in that entry and, if set, it can reject the said subsequent BU message.

In addition, it is also appropriate that, only when receiving a new BU message, the home agent starts the loop detection algorithm and, in the case of the BU message for updating the existing binding, inhibits the implementation of the algorithm.

Still additionally, it is also appropriate that the home agent temporarily accepts all new bindings and allocates short lifetimes to these bindings. This enables the loop detection algorithm/loop cutoff algorithm to check the presence of a loop and further to transmit a binding acknowledgment quickly. In this case, the mobile routers are required to update the binding after the elapse of the short time.

In the case of no loop detection, the acceptance is made in the normal lifetime with respect to the next BU message related to the updating. On the other hand, in the case of the detection of a loop, the home agent can reject the BU message related to the updating. At this time, it is also appropriate that, as the reason for the rejection, the fact of the detection of the loop is notified to the mobile routers. Moreover, it is preferable that related information which allows the mobile routers to cut off the loop by themselves is added to a BA message.

Furthermore, as another embodiment, it is also acceptable that a plurality of home agents are disposed in the home network. A person skilled in the art would clearly recognize that the present invention is not limited to a case in which each of the home agents carries out a loop detection algorithm. Still furthermore, it is also appropriate that the loop detection module 250 is packaged in an independent physical entity so as to carry out the loop detection in one or a plurality of home agents.

Although in the above-described embodiment the packet encapsulation (packet tunneling) is made at the packet transfer, instead of the encapsulation, there also exists a case in which a routing header is added to a packet and transferred. The present invention can detect a routing loop occurring among. MRs irrespective of such a packet transfer method.

In addition, although the present invention has been disclosed and described with an embodiment which is most practical and preferable, a person skilled in the art would clearly recognize that it is possible to make all changes on details of design matters and parameters which do not constitute departures from the spirit and scope of the invention.

For example, in this specification, the present invention has been described on the basis of the mechanism disclosed in Non-Patent Document 3 and, in particular, a home address of an access router is written as a value of an access router option. Meanwhile, a person skilled in the art would clearly recognize that the loop detection algorithm described in this specification is likewise applicable to a case in which, instead of the home address of the access router, a care-of address is stored in the access router option. In this case, in the comparison processing on the loop detection algorithm, the comparison between the ARO field 330 and the home address is replaced with a comparison between the ARO field 330 and the care-of address.

Each of the functional blocks used for the description of the embodiment of the present invention is typically realizable with an LSI (Large Scale Integration) producing an integrated circuit. These functional blocks can be formed individually as one chip, or a portion of or all of the functional blocks can also be formed as one chip. In this case, the LSI is sometimes referred to as an IC (Integrated Circuit), a system LSI, a super LSI or an ultra LSI according to the difference in level of integration.

Moreover, the approach to the formation of an integrated circuit is not limited to the LSI, but it is also appropriate to employ a dedicated circuit or general-purpose processor. It is also acceptable to utilize an FPGA (Field Programmable Gate Array) which enables the programming after the production of the LSI or a reconfigurable processor which allows the reconfiguration of connections and setting of circuit cells in the interior of the LSI.

Still moreover, if a technique for the formation of an integrated circuit replaceable with the LSI appears owing to advance in semiconductor technology or a different technology derived therefrom, the functional blocks can naturally be integrated through the use of this technique. For example, a biotechnology or the like may be applicable.

INDUSTRIAL APPLICABILITY

The present invention provides an advantage of a packet routing loop (in particular, a nesting loop formed, by mobile routers) being detectable, and it is applicable to communication fields related to packet-switched data communication networks and to technical field of the detection of a packet routing loop (particularly, nesting loop).

The invention claimed is:

1. A routing loop detection control apparatus which is provided in a home agent of at least one of a plurality of mobile routers, said routine loop detection control apparatus comprising:

a binding date message receiving section that receives a binding update message including an address of each of said plurality of mobile routers from each of said plurality of mobile routers, said binding update message being added with an access router option including an address of a host mobile router connected to each of said plurality of mobile routers;

a binding cache storage that stores the address of each of said plurality of mobile routers received by the binding update message receiving section and binding information including the address of said host mobile router connected to each of said plurality of mobile routers;

a loop detecting section that detects a routing loop among said plurality of mobile routers on the basis of said binding information acquired by said binding update message receiving section;

a loop detection control section that, at addition or update of the binding information, accepts the binding information in a state where a lifetime shorter than a normal time is set with respect to the binding information and that, after a reply of a binding acknowledge message, controls said loop detecting section to make a verification as to whether or not the routing loop has occurred with respect to the accepted binding information; and a loop elimination control section that, when said loop detecting section has detected the routing loop, rejects the binding information upon receipt of a next binding update message relative to the binding information subjected to the setting of the shorter lifetime and further that, when the routing loop has not been detected by said loop detecting section, upon receipt of the next binding update message relative to the binding information subjected to the setting of the shorter lifetime, sets the normal lifetime with respect to the binding information and accepts the binding information.

2. A routing loop detection control apparatus which is provided in a home agent of at least one of a plurality of mobile routers, said routing loop detection control apparatus comprising:

a binding update message receiving section that receives a binding update message including an address of each of said plurality of mobile routers from each of said plurality of mobile routers, said binding update message being added with an access router option including an address of a host mobile router connected to each of said plurality of mobile routers;

a binding cache storage that stores the address of each of said plurality of mobile routers received by the binding update message receiving section and binding information including the address of said host mobile router connected to each of said plurality of mobile routers; and a loop detecting section that detects a routing loop among said plurality of mobile routers on the basis of said binding information acquired by said binding update message receiving section, wherein in case said routing loop detection control apparatus is provided in a home agent of a first mobile router among said plurality of mobile routers, said home agent of said first mobile router receives said binding update message from each of said plurality of mobile routers by having a second mobile router which forwards said binding update message sent from said first mobile router to said home agent of said first mobile router be configured to check predetermined information in said binding update message from said first mobile router and to send said binding message of said second mobile router to said home agent of said first mobile router.

* * * * *